United States Patent [19]

Yoshikawa et al.

[11] Patent Number: 5,614,986
[45] Date of Patent: Mar. 25, 1997

[54] PHOTOGRAPHIC PRINTING APPARATUS

[75] Inventors: Tohru Yoshikawa; Yoshiyuki Yamaji, both of Wakayama, Japan

[73] Assignee: Noritsu Koki Co., Ltd., Wakayama, Japan

[21] Appl. No.: 419,396

[22] Filed: Apr. 10, 1995

[30] Foreign Application Priority Data

Apr. 11, 1994 [JP] Japan .................................. 6-072141

[51] Int. Cl.⁶ .............................. G03B 27/00; G03B 27/62
[52] U.S. Cl. .................................. 355/18; 355/50; 355/75
[58] Field of Search .................................. 355/40, 35, 53, 355/27–29, 77, 72, 75, 41, 38, 50; 354/19, 354, 298, 319–323; G03B 27/00, 27/62

[56] References Cited

U.S. PATENT DOCUMENTS

| | | | |
|---|---|---|---|
| 3,753,486 | 8/1973 | Vogt et al. ............................ | 198/131 |
| 4,724,463 | 2/1988 | Matsumoto ............................ | 355/29 |
| 4,835,574 | 5/1989 | Ohi ....................................... | 355/27 |
| 4,888,613 | 12/1989 | Zangenfeind et al. ................ | 355/41 |
| 4,922,289 | 5/1990 | Kogane et al. ........................ | 355/29 |
| 5,038,167 | 8/1991 | Suzuki .................................. | 355/41 |
| 5,093,686 | 3/1992 | Shigaki . | |
| 5,223,890 | 6/1993 | Sakakibara et al. .................. | 355/75 |
| 5,430,522 | 7/1995 | Kobayashi et al. ................... | 355/27 |

FOREIGN PATENT DOCUMENTS

0423810  4/1991  European Pat. Off. .

Primary Examiner—Arthur T. Grimley
Assistant Examiner—Herbert Kerner
Attorney, Agent, or Firm—Wenderoth, Lind & Ponack

[57] ABSTRACT

A photographic printing apparatus can process any of a roll of films, a strip of film and a film in a cartridge. A feed speed adjusting unit is provided between a scanner unit and a printing/exposure unit. A cartridge supply unit is provided upstream of the scanner unit and upstream of the printing/exposure unit. A strip of film is fed by a film carrier and a cartridge film is fed by a feed roller of a cartridge holder.

4 Claims, 10 Drawing Sheets

PHOTOGRAPHIC PRINTING APPARATUS

BACKGROUND OF THE INVENTION

This invention relates to photographic printing and apparatus capable of processing any of a roll of films, a strip of film detached from a cartridge, and a film housed in a cartridge.

One conventional photographic printing apparatus for printing images recorded on a film onto a photosensitive material comprises a scanner assembly and a printing/exposure assembly provided along a film guide for feeding films in a straight line. The scanner assembly optically reads image density data and other data for each frame of a film. After adjusting the density of light from a light source based on such data, such light is projected onto a film to print images thereof onto a photosensitive material.

The scanner assembly has a light source separate from a light source for the printing/exposure assembly, and a scanner for optically reading image density data and other data. Such data are transferred to the printing/exposure assembly after being converted to electric signals. After reading printing data, the film is fed into the printing/exposure assembly by the film guide and printed.

When processing many films continuously with such a conventional photographic printing apparatus, it is an ordinary practice to splice a plurality of films at their ends, wind them around a reel, and automatically feed the spliced and reeled films into the apparatus through its film inlet.

The scanner assembly reads image density data and other data from the spliced films. The films are then printed under the conditions determined by the data obtained in the scanner assembly. It takes a longer time to print a film than to read necessary data from the same film.

Because of this difference in processing time, it was impossible to read image density data of one film while another film is being printed. Also, it was impossible to print a film while the scanner assembly is reading image density data of another film.

Thus, it was impossible to process a plurality of films continuously with satisfactory speed and efficiency. In order to solve this problem, an improved printing apparatus was proposed in which the scanner assembly and the printing/exposure assembly are driven independently of each other, with a loop portion provided therebetween to adjust the feed speed of films.

Such an improved photoprinting apparatus can process spliced and reeled films with sufficiently high speed and efficiency.

But this apparatus can process only strips of films detached from cartridges. Namely, it cannot process films housed in cartridges. In order to process films in cartridges, it is necessary to use a printing apparatus equipped with some special means which makes it possible to do so. Such an apparatus is not only costly but also takes up a large amount of space.

An object of this invention to provide an apparatus for printing any of a roll of spliced films, a strip of film detached from a cartridge, and a film housed in a cartridge.

A second object is to provide such an apparatus which is compact and operates efficiently at low cost.

A third object is to provide such a photographic printing apparatus which can automatically feed a cartridge in the apparatus once it is supplied into the apparatus.

SUMMARY OF THE INVENTION

According to a method of printing films employing the invention one of the following two operations are selectively carried out according to the type of films to be processed. A first operation includes the steps of feeding rolls of films or strips of films detached from cartridges into a scanner means and a printing/exposure means provided along a film feed path, and adjusting the feed rate of films at a portion between such two means, whereby films are processed concurrently in the scanner means and the printing/exposure means. In a second operation film is rolled out of a cartridge upstream of the scanner means and upstream of the printing/exposure means and image data in the film are read and the film is printed, respectively.

The photographic printing apparatus includes a carrier unit having a film guide for feeding films along a straight film feed path, a scanner means and a printing/exposure means provided along the film feed path, the film guide including a feed speed adjusting means for adjusting the feed speed of films between the scanner means and the printing/exposure means. The scanner means and the printing/exposure means are driven independently of each other. Cartridge holder means are provided upstream of the scanner means and the printing/exposure means for feeding films into the scanner means and the printing/exposure means.

The cartridge holder means may include a pair of arms for releasably holding a cartridge therebetween, the apparatus further comprising a carrier means for transferring a cartridge released from one of the holder means to another holder means.

According to the invention, a roll of spliced films and a strip of film detached from a cartridge are processed in the same manner as with the conventional printing method. Namely, image data are read for each frame of a film in the scanner assembly, the film is fed to the printing/exposure assembly after adjusting its feed speed, and film is printed in the printing/exposure assembly after adjusting the printing conditions based on the image data read in the scanner assembly.

When processing a film housed in a cartridge, the film is fed into the scanner assembly to read necessary data from the film. Then, the film is fed into the printing/exposure assembly for printing. One of the above two operations is selectively carried out according to how films are supplied into the apparatus. Any type of film can be processed in the same one apparatus.

The apparatus of this invention has cartridge holders provided upstream of the scanner assembly and the printing/exposure assembly. A cartridge is set in the cartridge holder provided upstream of the scanner assembly. In this state, its film is fed into the scanner assembly to read image data. Then, the film is rewound into the cartridge, and the cartridge is then set in the other cartridge holder to feed the film into the printing/exposure assembly for printing. Once printed, the film is rewound into the cartridge.

This apparatus may further comprise a carrier means for transferring a cartridge from the cartridge holder near the scanner assembly to the other cartridge holder. With this arrangement, once a cartridge is set in the cartridge holder near the scanner assembly, the following steps can be carried out fully automatically. What an operator has to do thereafter is simply to remove the cartridge containing the printed film from the cartridge holder near the printing/exposure assembly.

Other features and objects of the present invention will become apparent from the following description made with reference to the accompanying drawings, in which:

DETAILED DESCRIPTION OF THE PREFERRED EMBODIMENT

Figure 1:
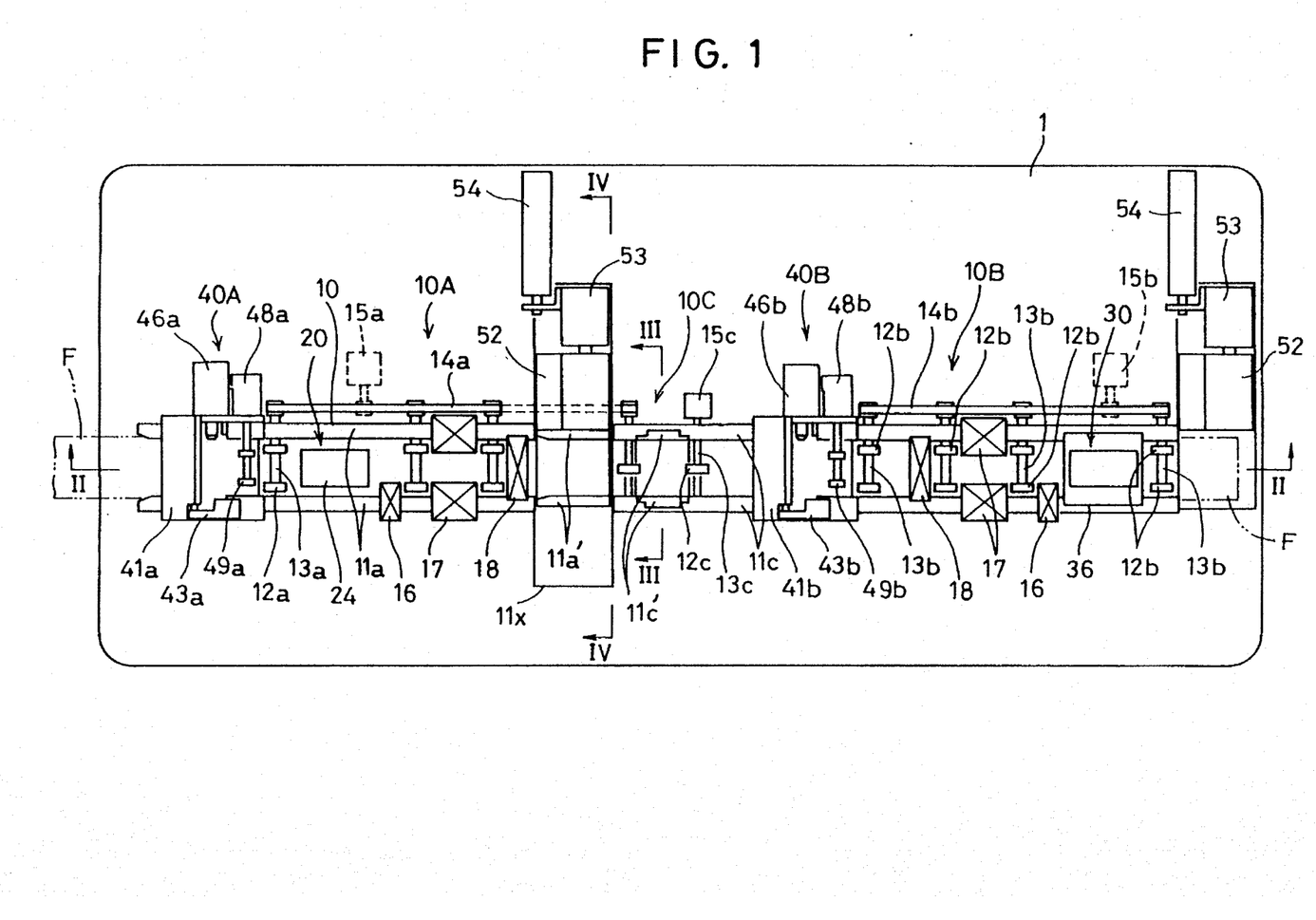
FIG. 1 is a schematic plan view of the entire photographic printing apparatus of one embodiment of the invention.

FIG. 1 is a plan view of the entire photographic/processing apparatus. It comprises a film carrying assembly 10 which feeds rectilinearly a strip of film, a scanner assembly 20 provided along the path of the film, a printing/exposure assembly 30, and film cartridge supply units 40A and 40B upstream of the scanner assembly 20 and printing/exposure assembly 30, respectively. These elements are all placed on a common base 1.

The film carrying assembly 10 comprises a scanner assembly carrying unit 10A, a printing/exposure assembly carrying unit 10B and a film feed adjusting unit 10C mounted between the units 10A and 10B. The scanner assembly carrying unit 10A has a pair of film guides 11a, a plurality of pairs of feed rollers 12a, rotation shafts 13a of feed rollers 12a, belt 14a and a motor 15a which rotates the rotation shafts 13a through the belt 14a. A perforation detector 16 is provided along one of the film guides 11a. 17 designates a magnetic head and 18 a film cleaner.

A pair of film guides 11a' each integrally formed with a film rewinder are provided at downstream ends of the film guides 11a so as to take up a cartridge film (which will be described later). The film guides 11a' are slidably connected with the film guides 11a whenever necessary.

Figure 2:
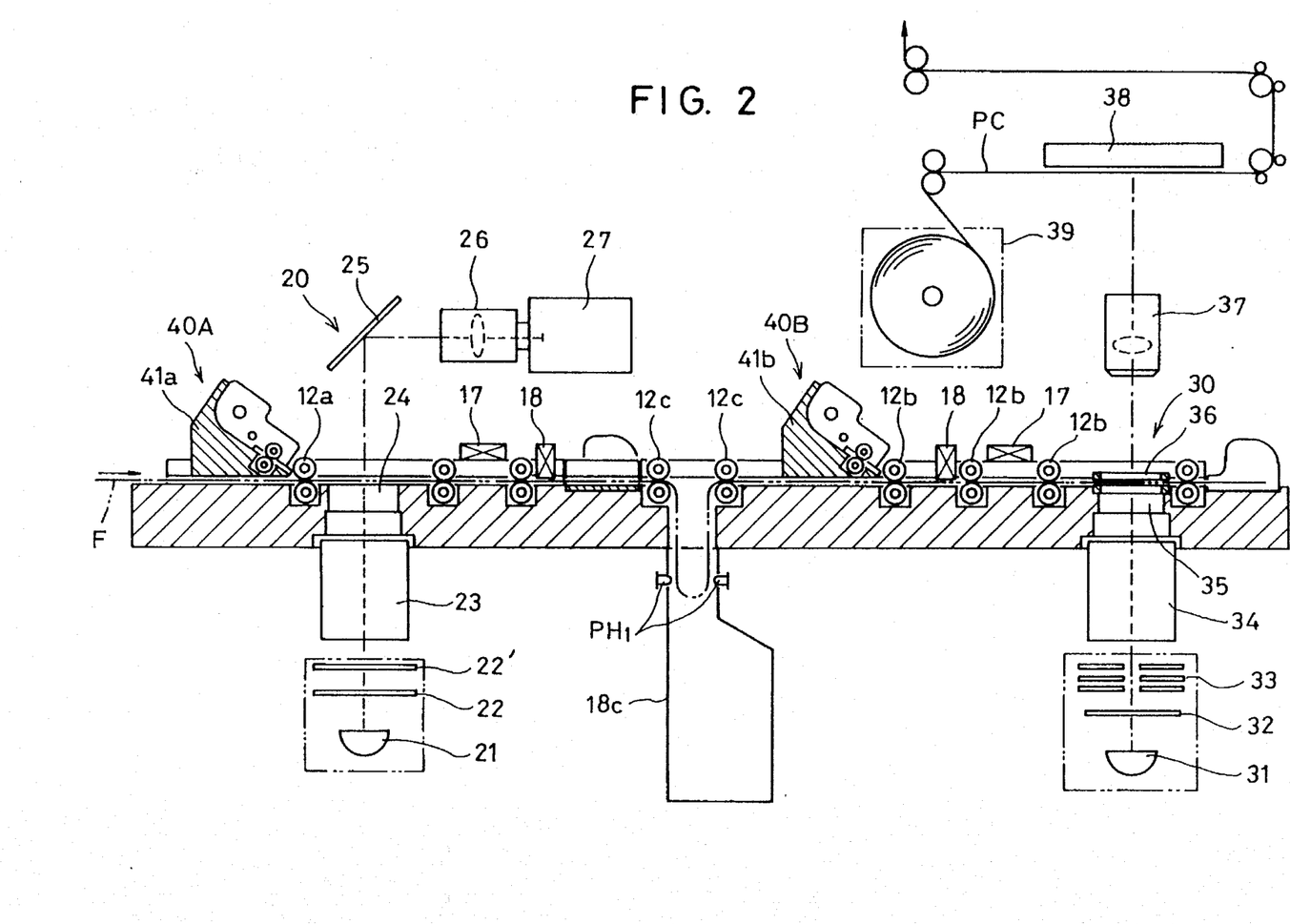
FIG. 2 is a sectional view taken along line II—II of FIG. 1.

The scanner assembly 20 is a conventional type and is shown in FIG. 2. The light from a light source 21 mounted under the film guides 11a passes through a filter 22, a shutter 22', a mirror tunnel 23 and a scanner opening 24 and illuminates the film F. Then, the image light is received by a scanner 27 after passing through a reflecting mirror 25 and a condenser lens 26.

The printing/exposure assembly carrying unit 10B is of substantially the same structure as the unit 10A. It is different therefrom in that the perforation detector 16, the magnetic head 17 and the cleaner 18 are provided in a reverse order to the unit 10A. The motors 15a and 15b are driven separately.

Between the scanner assembly carrying unit 10A and the printing/exposure assembly carrying unit 10B is provided the film feed adjusting unit 10C. It comprises a pair of film guides 11c connected to the slidable film guides 11a', a plurality of feed rollers 12c and a pair of loop guides 11c'.

Figure 3A:
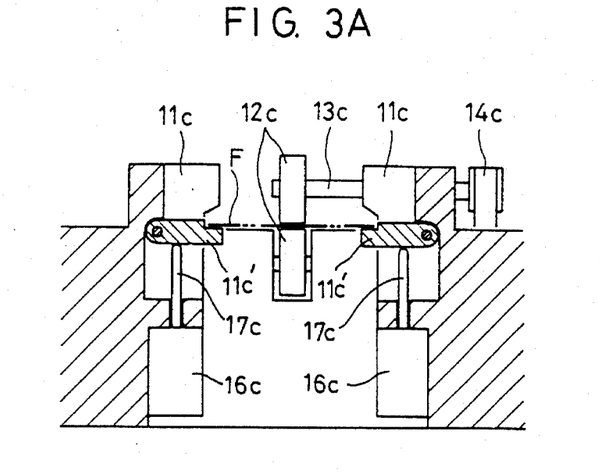
FIGS. 3A and 3B are sectional views taken along line III—III of FIG. 1.
Figure 3B:
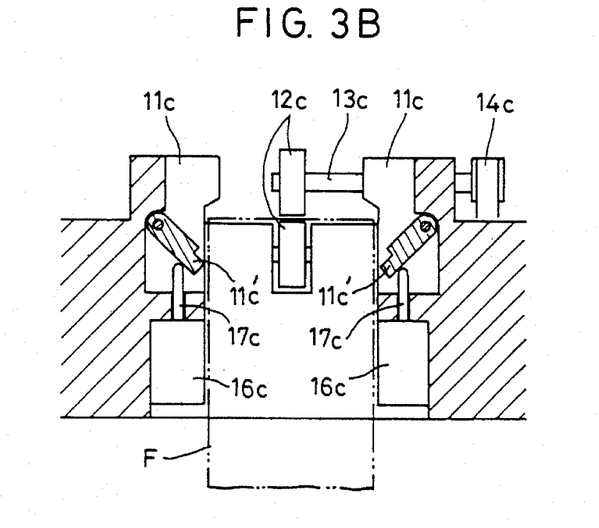

The driving power of a motor 15c is transmitted to rotation shafts 13c through a belt 14c to rotate the feed rollers 12c. As shown in FIGS. 3A and 3B, when inoperative, each of the loop guides 11c' is kept horizontal by a pin 17c of a solenoid 16c. In operation, the pins 17c move downwards together with the loop guides 11c', thereby allowing the film F to sag. As a result, as shown in FIG. 2, the film F dangles in a loop tank 18c formed under the loop guides 11c'. In FIG. 2, pH1 is a photoelectric sensor to detect whether or not the film F is dangling down.

The printing/exposure assembly 30 is also of a conventional type. The light from a light source 31 hits the film F set in a film mask 36 through a heat absorption filter 32, a light-adjusting filter 33, a mirror tunnel 34 and a printing opening 35. Each frame is printed and exposed through a lens 37 on a photosensitive material PC which is maintained by a paper mask 38.

Figure 5A:
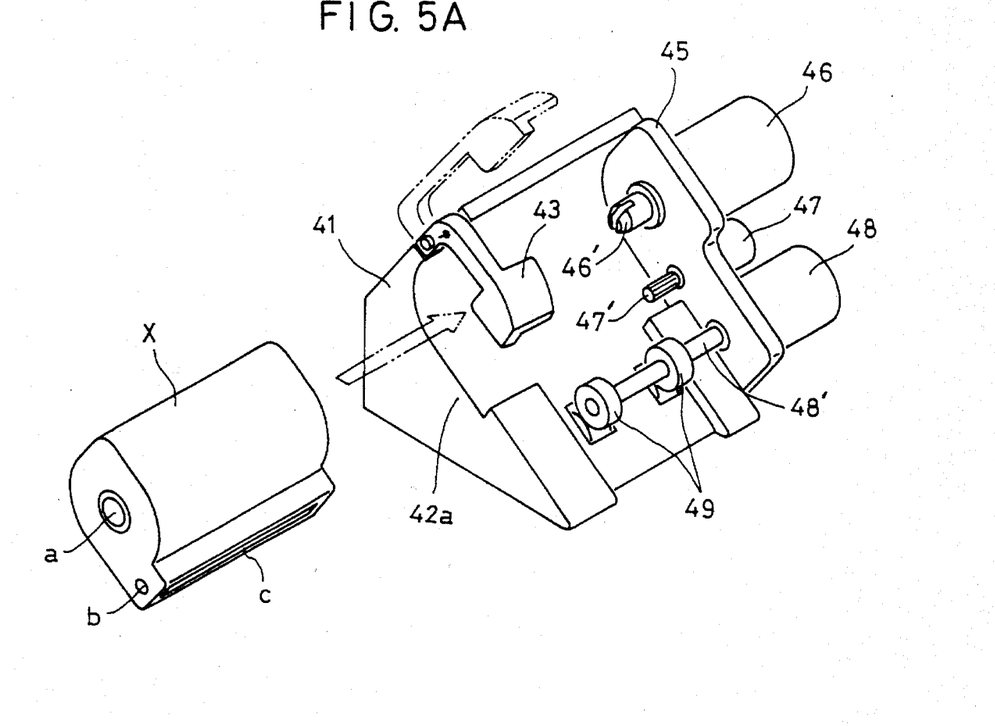
FIGS. 5A and 5B are a perspective view and a partial sectional view of a cartridge holder.

The film cartridge supply unit 40A has a cartridge holder 41a so that a cartridge film can be supplied from upstream of a pair of the feed rollers 12a at the scanner assembly. As shown in FIG. 5A, cartridge holder 41a is formed on a diagonal side thereof with a recessed portion 42a to maintain a snail-shaped cartridge X in this position.

To insert the cartridge X into the recessed portion 42a, the force of a spring 44 normally acting on a presser 43 is released and the presser 43 is lifted by hand. The cartridge X has a core and a lid c to insert and withdraw the film. Through holes a and b are formed in the core and the lid. Motors 46 and 47 are fixedly mounted on a side wall 45 of the cartridge holder 41a. Also, protruding shafts 46' and 47' of the motors 46 and 47 engage in the holes a and b.

Another motor 45 is also mounted on the side wall 45 and has an output shaft 48' extending through the side wall 45 and carrying a pair of feed rollers 49 which engage mating rollers 49'. The film in the cartridge X can be rolled out by rotating the rollers 49 with the film between the rollers 49 and 49'. The mating rollers 49' are rotatably mounted on a support shaft 50 which is resiliently supported on springs 51.

The film cartridge supply unit 40B for the printing/exposure assembly 30 is of exactly the same structure as the film cartridge supply unit 40A. Thus, like functional elements are denoted by the same numerals with the letter b affixed thereto and their description is omitted.

FIGS. 1 and 2 show the setting of the machine when processing strips of films. When processing films housed in cartridges, slidable film winders 52 are used for both the scanner assembly and the printing/exposure assembly. The film winders 52 are driven by motors 53. Though not shown, the film winders 52 and motors 53 are mounted on a common slide plate. By pushing the slide plates with cylinders 54, the film winders 52 can be moved to the downstream ends of the film guides 11a and 11b. In this state, films fed to the ends of the film guides 11a and 11b are wound into the winders 52.

The film guides 11a' are fixed to the film winder 52 for the scanner assembly. When processing strips of films, the film guides 11a' are aligned with the film guides 11a and 11b. When processing films housed in cartridges, the film winder 52 is moved to the end of the film guides 11a, so that the film guides 11a' are moved to the area designated by 11x in FIG. 1.

Description now will be made of how this photographic printing apparatus is used to selectively print strips of films and films housed in cartridges. Films of either type used in this invention carry a magnetic memory. As mentioned above, the apparatus is set as shown in FIGS. 1 and 2 when processing strips of films. Namely, the film guides 11a, 11a', 11c and 11b are aligned with one another. A strip of film is inserted into the film guides 11a from the lefthand end of the figures and fed by the feed rollers 12a. The film is stopped every time each frame comes right over the scanner opening 24 in the scanner assembly 20 to read image density data for each frame.

Then, the perforation detector 16 detects the position of each frame, and the magnetic head 17 reads the magnetic data stored in the memory of the film. The strip of film is then fed through the film guides 11a', 11c into the film guides 11b, where the magnetic head 17 and the perforation detector 16 in the printing/exposure assembly 30 confirm the magnetic data and the position of each frame, respectively. When each frame comes right over the printing/exposure assembly 30, the film stops. The way the film is printed in the printing/exposure assembly 30 is nothing different from the conventional printing process. Thus, detailed description thereof is omitted.

In this embodiment, the scanner assembly 20 and the printing/exposure assembly 30 are driven independently of each other. Generally, it takes a longer time to print films in the printing/exposure assembly 30 than to read image density data and other data in the scanner assembly 20. Thus, the film F tends to slacken at the portion between the scanner assembly 20 and the printing/exposure assembly 30. When the film slackens at this portion, the loop guides 11c' in the feed adjusting unit 10C move from the horizontal inoperative position to the vertical operative position shown in FIG. 3B, allowing the film F to sag into loop tank 18c shown in FIG. 2. When the film F has been printed, it is discharged from the righthand end of the apparatus.

Figure 4:
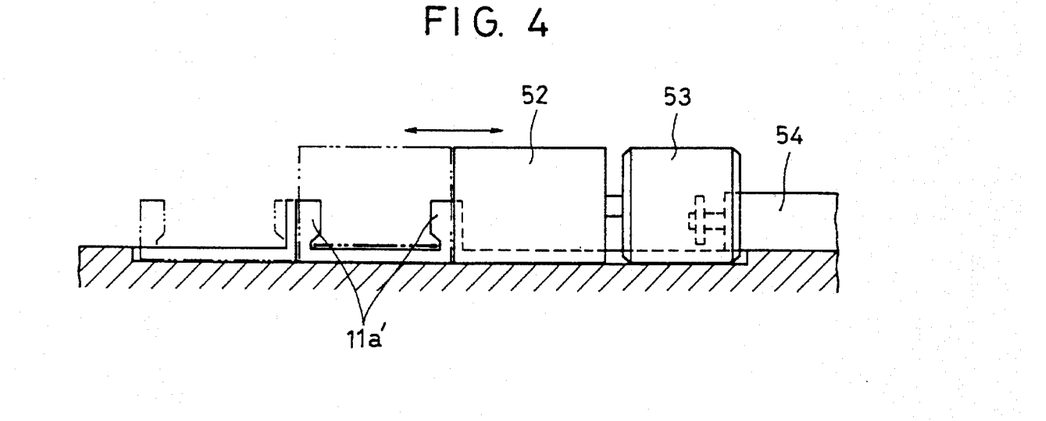
FIG. 4 is a sectional view taken along line IV—IV of FIG. 1.
Figure 5B:
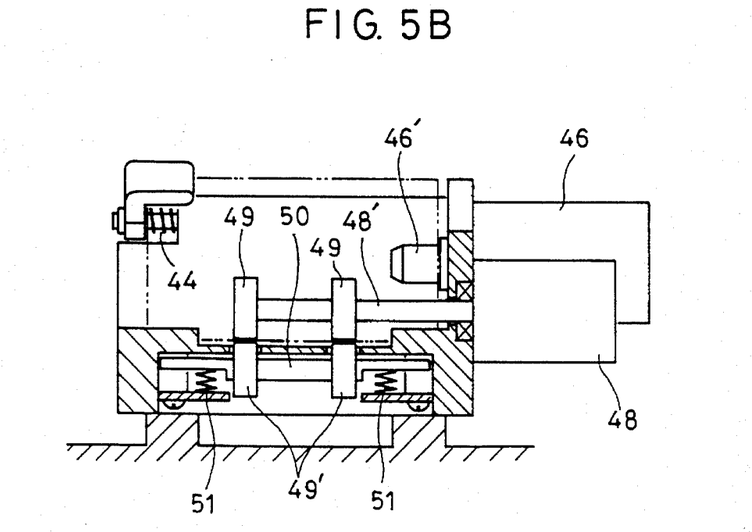
Figure 6:
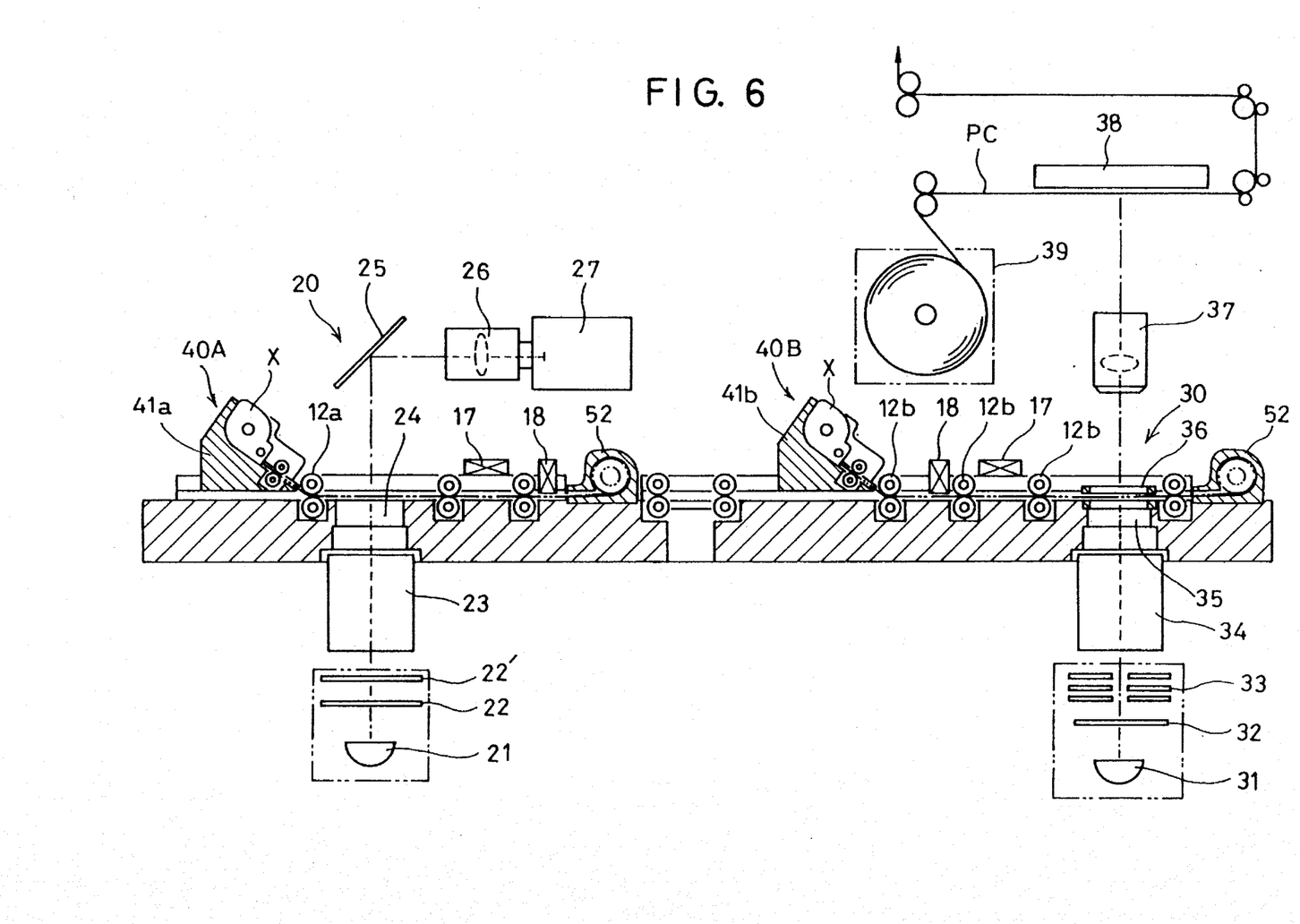
FIG. 6 is a shematic section showing how a film housed in a cartridge is processed.

Description now will be made of how a film housed in a cartridge is processed. After discharging all of the strips of films remaining in the apparatus, the winders 52 are moved to the downstream ends of the film guides 11a and 11b as shown in FIG. 4. Then a cartridge X housing a film to be processed is set in the cartridge holder 41a for the scanner assembly shown in FIGS. 5A and 5B.

In this state, the motor 47 shown in FIG. 5A is activated to open the lid c of the cartridge X. Then, the motors 46 and 48 are activated to feed the film out of the cartridge X and insert it into the film guides 11a by rotating the feed rollers 49.

The scanner assembly 20 reads image density data and other necessary data for each frame of the film in exactly the same manner as when reading data from a strip of film. When the end of the film fed from the cartridge X is inserted into the winder 52, its motor 53 is activated to wind the film into the winder 52. When all the frames of the film have been processed in the scanner assembly, the motor 48 for the feed rollers 49 in the cartridge holder 41a, the motor 15a for the feed rollers 12a provided along the film guides 11a, and the motor 53 are all reversed to rewind the film into the cartridge X.

Once the film has been rewound into the cartridge X, the latter is detached from the cartridge holder 41a, and then set in the cartridge holder 41b for the printing/exposure assembly 30. Thereafter, the film is processed in the same way as when processing strips of films. The printed part of the film F is wound into the winder 52. When all the frames have been printed, the film is rewound into the cartridge X, and the latter is detached from the cartridge. This completes the operation for one cartridge. A plurality of cartridges are processed one after another in this way.

Figure 7:
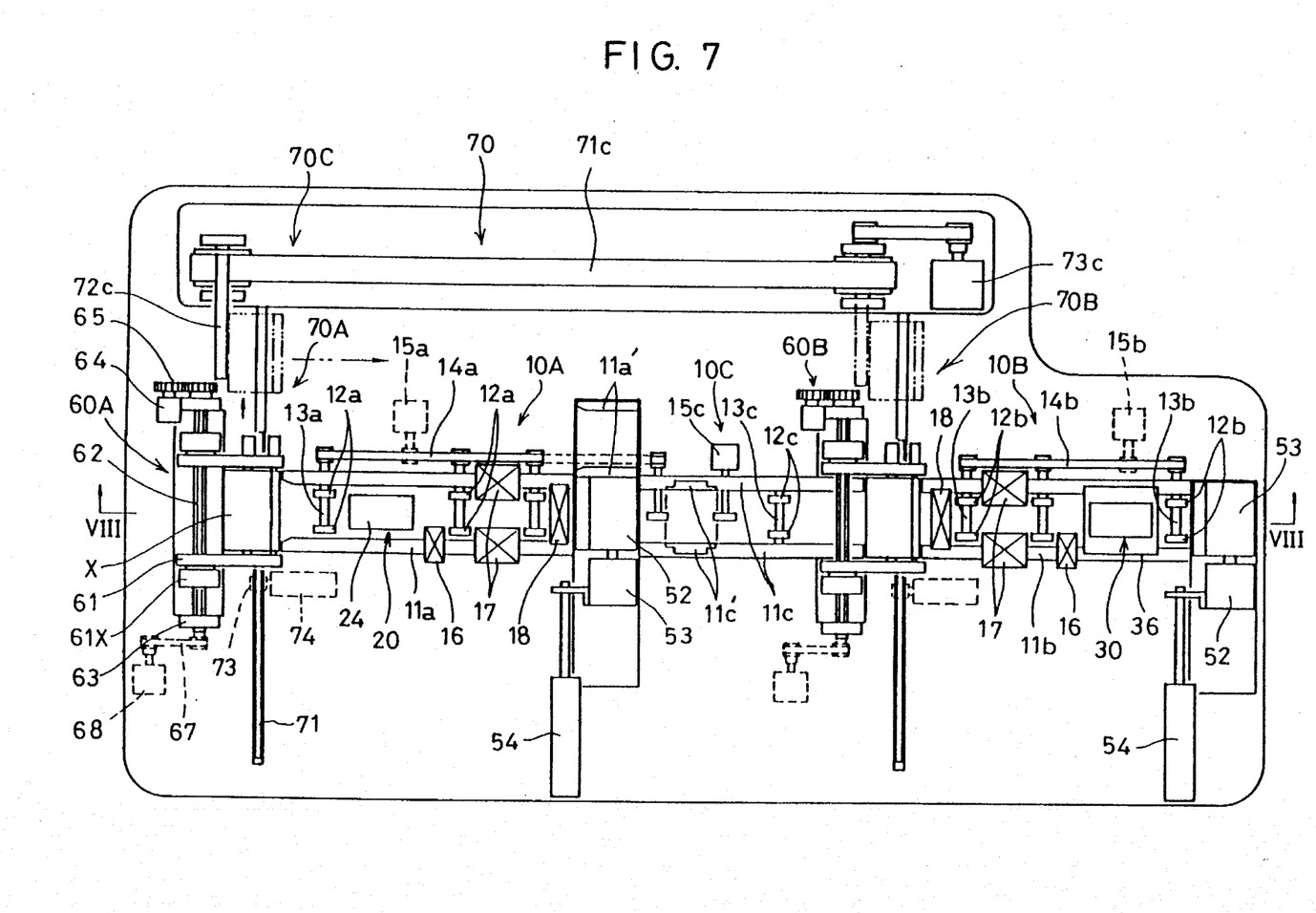
FIG. 7 is a shematic plan view of the entire photographic printing apparatus of a second embodiment.

FIG. 7 is a plan view of the photographic printing apparatus of the second embodiment. This embodiment is basically of the same structure as the first embodiment, but differs in that films in cartridges can be processed semiautomatically. The same functional elements as the first embodiment are denoted by the same numerals and their description is omitted. In this embodiment, the driving units for the winders 52 are provided on the opposite side of the winders 52 to those in the first embodiment.

Figure 8:
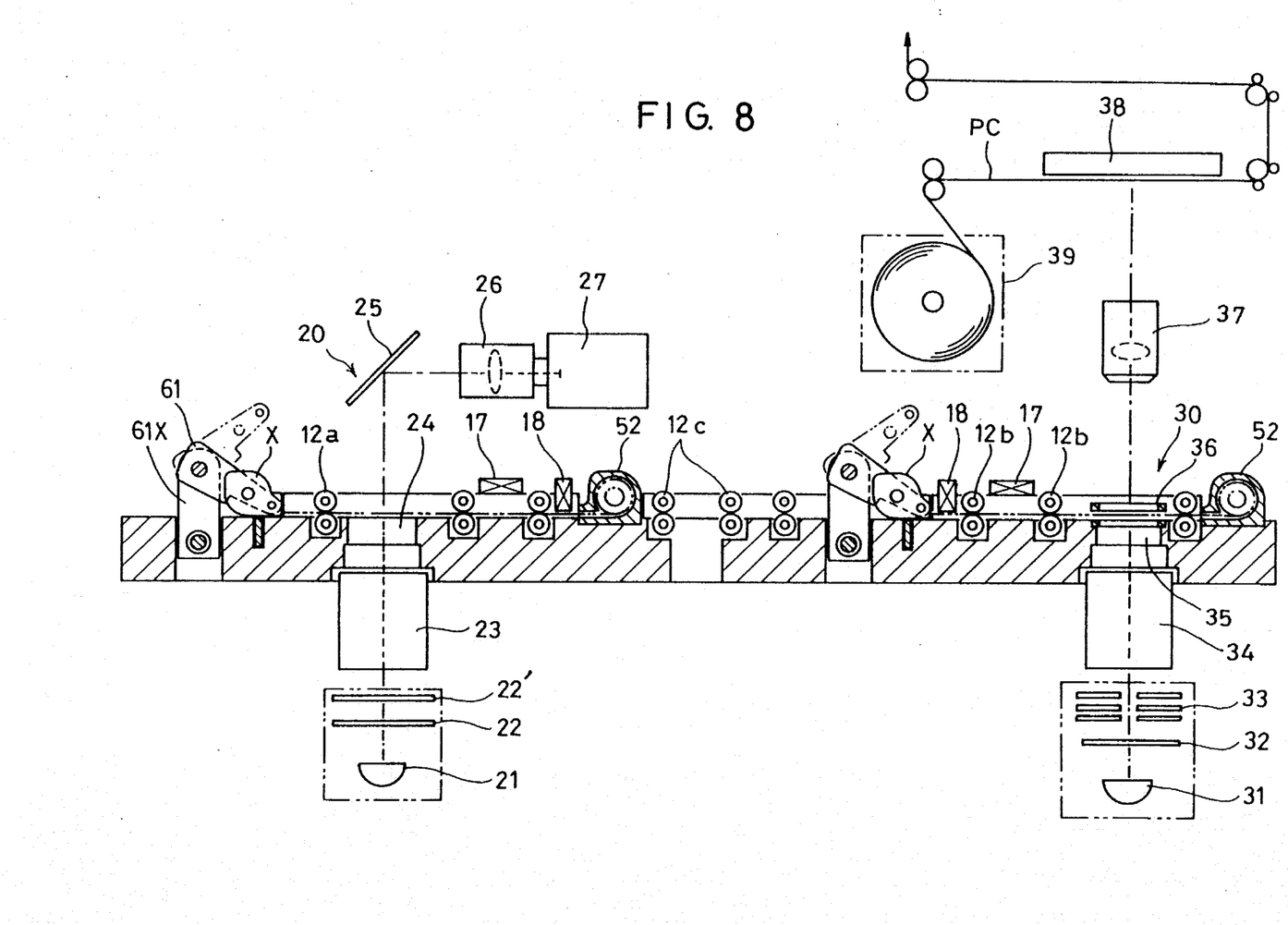
FIG. 8 is a sectional view taken along line VIII—VIII of FIG. 7.

In this embodiment, as shown in FIG. 7, the cartridge holders 41a and 41b shown in FIG. 1 are replaced by a cartridge holder 60A provided immediately upstream of the scanner unit, a cartridge holder 60B provided immediately upstream of the printing/exposure assembly, and a carrier unit 70 for transferring a cartridge X from the cartridge holder 60A to the cartridge holder 60B. FIG. 8 is a sectional view taken along line VIII—VIII of FIG. 7.

Figure 9:
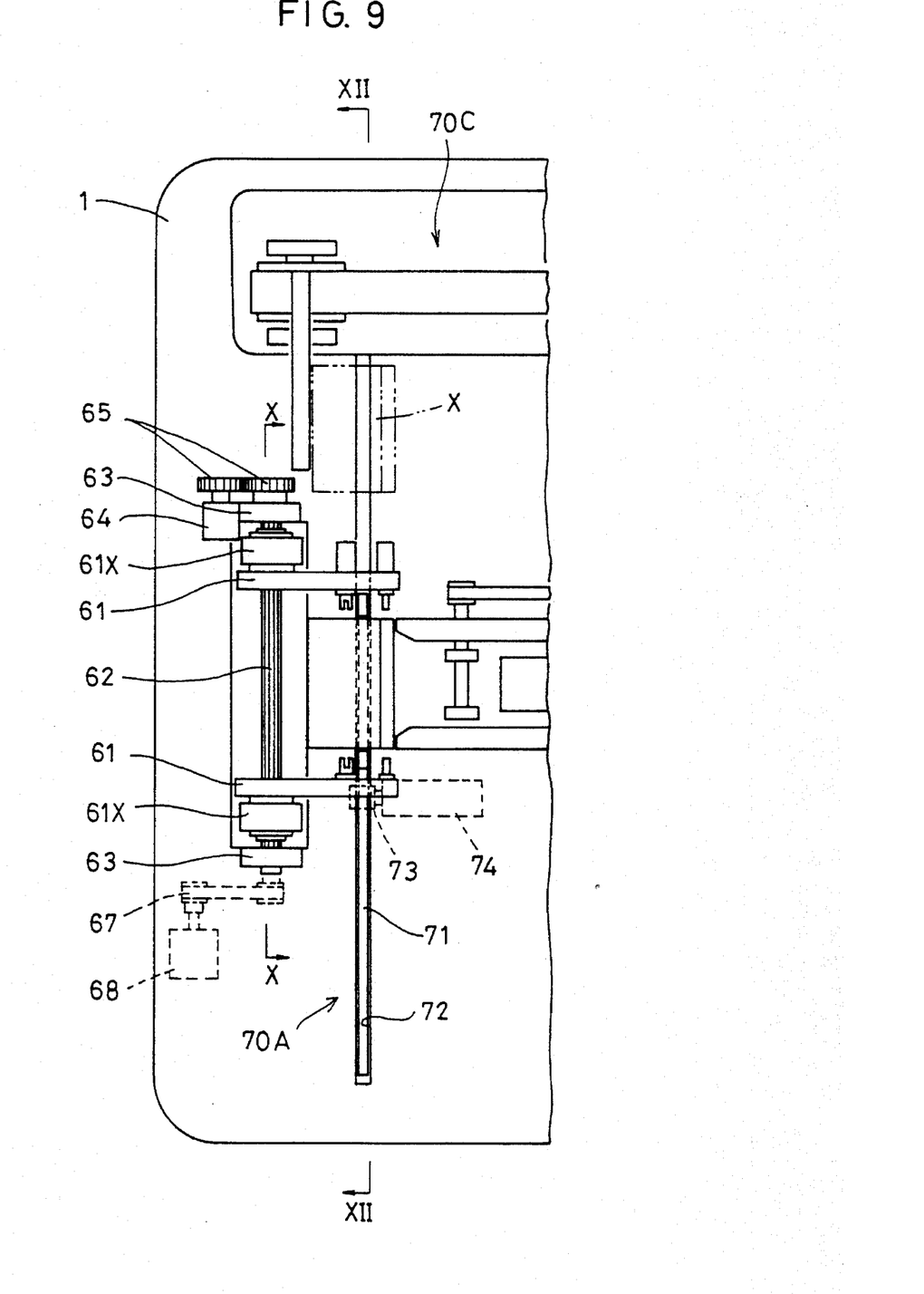
FIG. 9 is an enlarged plan view of the cartridge holder and the surrounding area.
Figure 10:
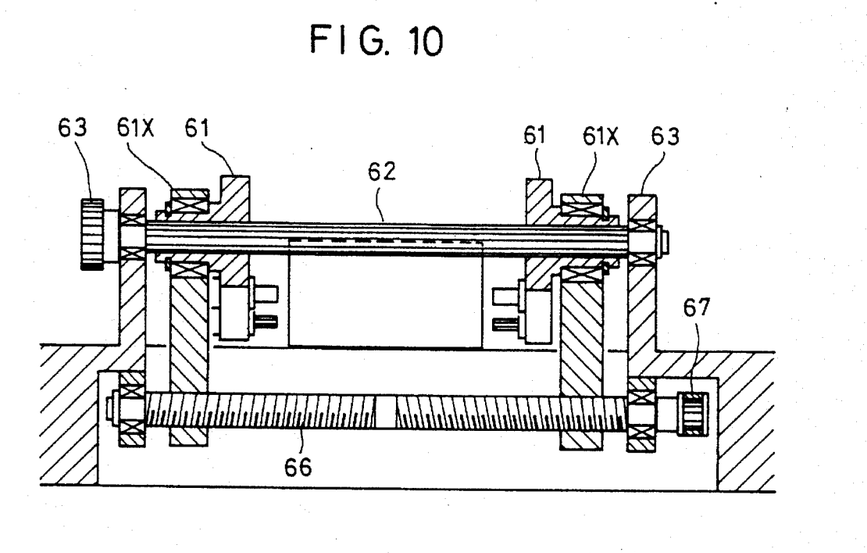
FIG. 10 is a sectional view taken along line X—X of FIG. 9.

FIG. 9 shows an enlarged plan view of the cartridge holder 60A. As shown, it includes a pair of arms 61 slidably mounted on a spline shaft 62 supported on a pair of support plates 63 through bearings. A motor 64 is mounted at one end of the spline shaft 62 to rotate it through gears 65. The arms 61 have their bases journaled in levers 61X through bearings. A threaded rod 66 having inversely threaded portions is threadedly engaged in the levers 61X as shown in FIG. 10. As shown in FIG. 9, a motor 68 is provided at one end of the threaded rod to rotate it through a belt 67. By rotating the threaded rod either clockwise or counterclockwise, the distance between the levers 61X and thus the distance between the arms 61 are adjustable so that a cartridge X can be held between the arms 61.

Figure 11:
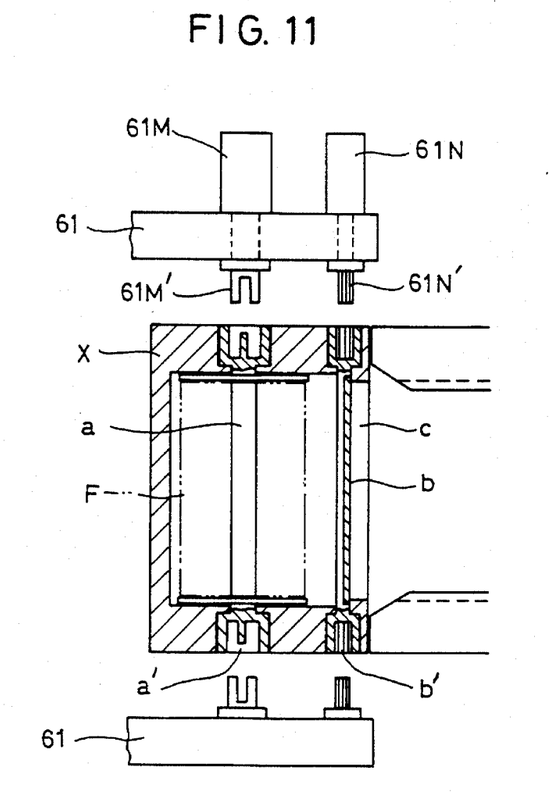
FIG. 11 is an enlarged plan view of leading ends of arms of the cartridge holder.

FIG. 11 shows an enlarged view of the front ends of the arms 61. It also shows the section of the cartridge X. Motors 61M and 61N are mounted on one of the arms 61. Their output shafts are connected to engaging pins 61M' and 61N'. The other arm 61 carries only rotatable engaging pins 61M' and 61N'. The cartridge X comprises a housing having a snail shell-shape and a swing door c through which a film F is rolled out and in, a core a for winding the film, and a rod b for opening and closing the door c.

By moving the arms 61 toward each other, the engaging pins 61M' and 61N' will engage in holes a' and b' formed in the side walls of the cartridge X. In this state, the motor 61N is turned to open the door C and then, the motor 61M is turned to wind or unwind the film F. To remove the cartridge X from the holder, the motor 68 is rotated to move the levers 61X and thus the arms 61 away from each other until the pins 61M' and 61N' disengage from the holes a' and b'. Then, the motor 64 is actuated to rotate the spline shaft 62 in such a direction that the arms 61, which engage the splines of the shaft 62, pivot and their front ends are raised. In this state, the cartridge X can be moved laterally.

The cartridge holder 60B for the printing/exposure assembly shown in FIG. 7 is exactly the same structure as the cartridge holder 60A.

Figure 12:
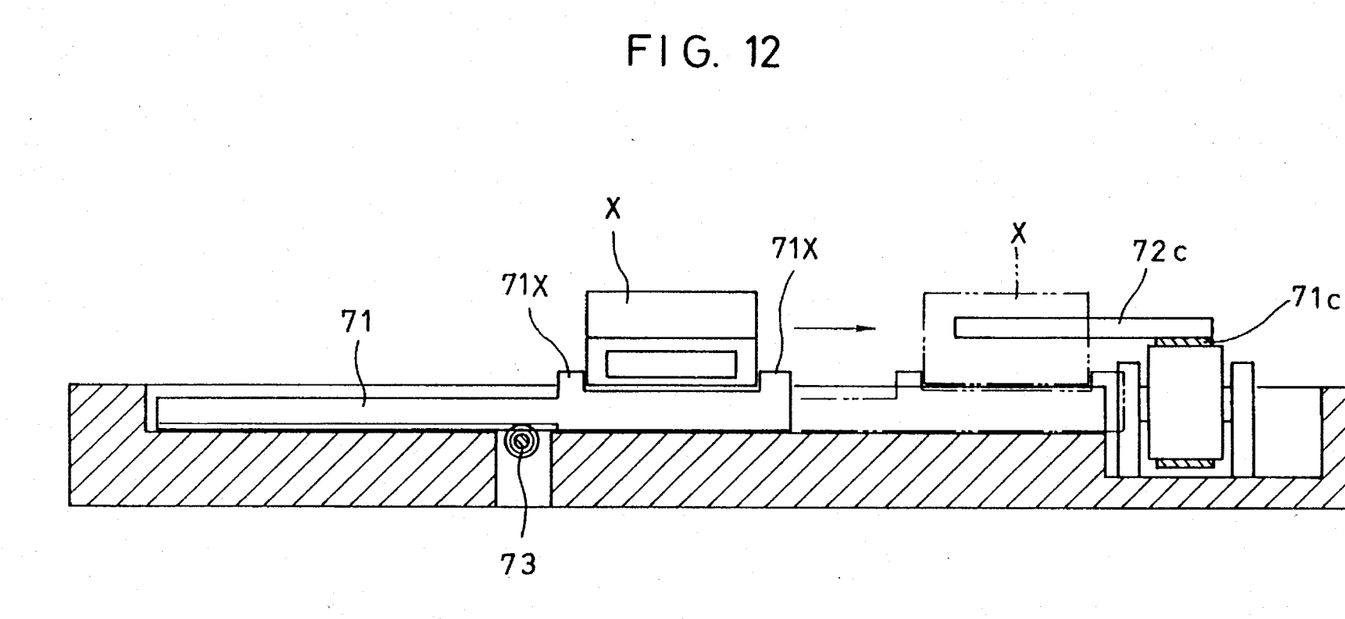
FIG. 12 is a sectional view taken along line XII—XII of FIG. 9.

The cartridge carrier 70 shown in FIG. 7 is-]-shaped and comprises lateral feed portions 70A and 70B extending perpendicular to the film guides, and a longitudinal feed portion 70C. FIG. 12 shows a section of the lateral feed portion 70A taken along line XII—XII of FIG. 9.

As shown in FIGS. 9 and 12, the lateral feed portion 70A has a guide lever 71 slidably mounted in a guide groove 72.

It can be moved along the groove 72 by turning a pinion 73 with a motor 74 with a cartridge X held thereon between projections 71X formed at one end thereof.

The longitudinal feed portion 70C for feeding a cartridge X in the longitudinal direction includes an endless belt 71c, a motor 73c for driving the belt 71c, and a feed lever 72c fixedly mounted on the belt 71c so as to be reciprocated by the belt 71c while keeping its horizontal position.

In this embodiment, once a cartridge X is manually set in the cartridge holder 60A on the lefthand side in FIG. 7, the following steps are carried out fully automatically. When the film has been printed, the cartridge X is simply removed manually from the righthand cartridge holder 60B.

When the cartridge X is set in the holder 60A, the arms 61, which have been raised as shown by two-dot chain lines in FIG. 8, are lowered to the position shown by solid lines. Then, the arms 61 are moved toward each other to hold the cartridge X therebetween. In this state, the film F in the cartridge X is fed into the scanner assembly, where image density data for each frame are read.

After reading necessary data, the film is rewound into the cartridge X. In this state, the arms 61 are moved away from each other and raised until they disengage from the cartridge X. Then, the guide lever 71 of the lateral feed portion 70A, which supports the cartridge X, is moved laterally to transfer the cartridge X to the longitudinal feed portion 70C.

The cartridge X is then fed longitudinally by being pushed by the feed lever 72c until the cartridge runs onto the guide lever 71b of the lateral feed portion 70B for the printing/exposure assembly. The guide lever 71b or portion 70B, now carrying the cartridge, is moved laterally until the center of the cartridge X coincides with the center of the film guides 11b.

Once the cartridge X is set in this position, the film F is fed into the printing/exposure assembly. The film is printed in the same manner as with the first embodiment. When the film has been printed, it is rewound into the cartridge X.

The cartridge X may be transferred from the scanner assembly to the printing/exposure assembly in a different manner. For example, the cartridge X set in the cartridge holder 60A may be lifted, fed toward the printing/exposure assembly along a guide rail, and lowered into the cartridge holder 60B.

Otherwise, the carrier portion may have a circular feed path instead of the ]-shaped feed path.

What is claimed is:

1. A photographic printing apparatus comprising:

a carrier unit having a film guide for feeding films along a straight film feed path;

a scanner means and a printing/exposure means provided along said film feed path, said scanner means and said printing/exposure means being driven independently of each other;

said film guide including a film feed speed adjusting means for adjusting the speed of feeding of films between said scanner means and said printing/exposure means;

first cartridge holder means provided upstream of said scanner means for supporting a film cartridge and for feeding films stored therein to said scanner means and rewinding the films back into the film cartridge;

second cartridge holder means provided upstream of said printing/exposure means for supporting a film cartridge and for feeding films stored therein to said printing/exposure means and rewinding the films back into the film cartridge; and inlet means at an upstream end of said film feed path for inserting a film not in a cartridge into said scanner means.

2. A photographic printing apparatus as claimed in claim 1, wherein each of said first and second cartridge holder means comprises a pair of arms operable to releasably hold therebetween the respective cartridge.

3. A photographic printing apparatus as claimed in claim 2, further comprising carrier means for transferring a cartridge released from said first cartridge holder means to said second cartridge holder means and positioning the thus transferred cartridge in said second cartridge holder means.

4. A photographic printing apparatus as claimed in claim 1, further comprising carrier means for transferring a cartridge from said first cartridge holder means to said second cartridge holder means and positioning the thus transferred cartridge in said second cartridge holder means.

* * * * *